United States Patent

Smith

[11] Patent Number: 5,875,631
[45] Date of Patent: Mar. 2, 1999

[54] CONTROL SYSTEM FOR A HYDROSTATIC TRANSMISSION

[75] Inventor: David P. Smith, Joliet, Ill.

[73] Assignee: Caterpillar Inc., Peoria, Ill.

[21] Appl. No.: 760,092

[22] Filed: Dec. 11, 1996

[51] Int. Cl.⁶ .................................................. F16D 31/02
[52] U.S. Cl. .............................. 060/444; 60/443; 60/486; 91/48; 91/51
[58] Field of Search ............................ 60/443, 444, 486; 91/48, 51

[56] References Cited

U.S. PATENT DOCUMENTS

| | | | |
|---|---|---|---|
| Re. 27,488 | 9/1972 | Lauck . | |
| 3,805,676 | 4/1974 | Hamma et al. | 60/444 |
| 4,076,090 | 2/1978 | Krusche et al. . | |
| 4,203,290 | 5/1980 | Burchardt | 60/486 |
| 4,211,256 | 7/1980 | Sturtz | 91/51 |
| 4,376,371 | 3/1983 | Kojima et al. . | |
| 4,395,878 | 8/1983 | Morita et al. . | |
| 4,599,855 | 7/1986 | Seelman | 60/444 |
| 4,949,823 | 8/1990 | Coutant et al. . | |
| 4,955,442 | 9/1990 | Crabb et al. . | |

FOREIGN PATENT DOCUMENTS 2128718  2/1983  United Kingdom .

*Primary Examiner*—F. Daniel Lopez
*Attorney, Agent, or Firm*—John W. Grant

[57] ABSTRACT

A hydrostatic transmission has a pair of overcenter variable displacement pumps, each having a flow control element controlled by a double acting actuator to control direction and flow rate of the pump. Fluid pressure in first and second chambers of each actuator are equal at a neutral position of the transmission. A forward control valve controllably communicates the first chambers of both actuators to a tank through a first orifice to reduce the pressure in the first chambers to simultaneously move the flow control elements in a first direction for forward travel. A reverse control valve controllably communicates the second chambers of both actuators to the tank through a second orifice to reduce the pressure in the second chambers to simultaneously move the flow control elements in a second direction for reverse travel. A right turn is made by selectively reducing the pressure in the second chamber of the right actuator during forward travel and in the first chamber during reverse travel by establishing fluid flow to the tank from the first or second chamber through a right turn position diverter valve and a right turn control valve. A left turn is made by selectively reducing the pressure in the second chamber of the left actuator during forward travel and in the first chamber during reverse travel by establishing fluid flow to the tank from the first or second chamber through one of another pair of orifices and a left two position diverter valve with a left turn control valve.

4 Claims, 1 Drawing Sheet

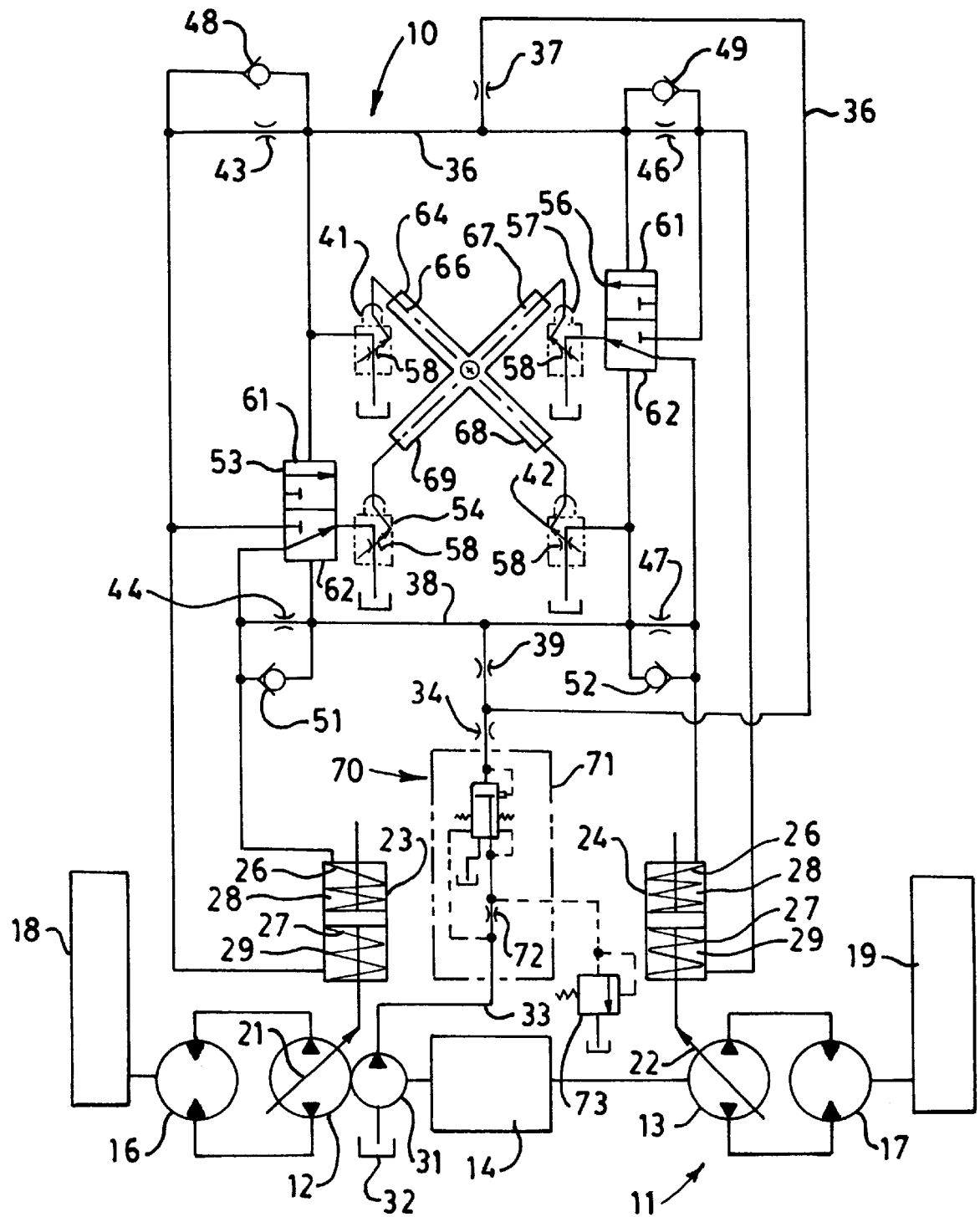

CONTROL SYSTEM FOR A HYDROSTATIC TRANSMISSION

TECHNICAL FIELD

This invention relates to a control system for a hydrostatic transmission for a mobile machine and, more particularly, to a bleed down type control system which provides automotive type steering wherein the machine travels over the same turn path when a direction change is made during a steering operation.

BACKGROUND ART

Some track type and skid steer machines use a hydrostatic transmission for propelling the machines. The hydrostatic transmissions have a pair of overcenter variable displacement pumps connected to a pair of hydraulic drive motors through closed loop circuits. Forward travel is achieved by simultaneously controlling the displacement of the variable displacement pumps to direct fluid to the motors in one direction while reverse travel is achieved by simultaneously controlling the displacements of the pumps to direct fluid to the motors in the opposite direction. Steering is accomplished in both forward and reverse travel by reducing the output of one pump while maintaining the output of the other pump at the preselected forward or reverse travel setting.

Heretofore, the output of the pumps for both the forward and reverse travel and the steering functions have been controlled by four pressure reducing valves and four ball resolvers with the pressure reducing valves being actuated by a joystick mechanism. However, that type of system produces an unnatural "S" shape turn when a directional change is made during a steering maneuver. Another problem encountered with that system is that when the engine of the machine lugs during a turning maneuver, the machine tends to straighten from the desired turn path. Another problem is that most pump controls interact with the joystick pressure reducing causing noticeable instability. Finally, most hydrostatic pilot controls do not provide counter rotation turns or spot turns in neutral.

Thus, it would be desirable to provide a control system for a hydrostatic transmission in which the machine travels over the same path when a directional change is made during a steering maneuver and in which a demanded turn does not straighten if the engine lugs during a turning maneuver.

The present invention is directed to overcoming one or more of the problems as set forth above.

DISCLOSURE OF THE INVENTION

In one aspect of the present invention, a control system is provided for a hydrostatic transmission having a pair of overcenter variable displacement pumps, each of which has a flow control element disposed to control direction and flow rate of fluid output from the associated pump and a double acting actuator connected to the flow control element and having a spring disposed in each of first and second actuating chambers to bias the flow control element to a centered zero output position. The control system includes a first conduit communicating a supply conduit with the first chambers, a first orifice disposed in the first conduit, a second conduit communicating the supply conduit with the second chambers, and a second orifice disposed in the second conduit. A forward control valve is disposed between a tank and the first conduit downstream of the first orifice. The forward control valve has a closed position blocking the first conduit from the tank and is movable to establish a variable orifice communicating the first conduit with the tank. A reverse control valve is disposed between the tank and the second conduit downstream of the second orifice. The reverse control valve has a closed position blocking the second conduit from the tank and is movable to establish a variable orifice communicating the first conduit with the tank. A lever device is provided for actuating each of the forward and reverse control valves independently of the other.

BRIEF DESCRIPTION OF THE DRAWINGS

The sole figure is a schematic illustration of an embodiment of the present invention.

BEST MODE FOR CARRYING OUT THE INVENTION

A control system 10 is shown in combination with a hydrostatic transmission 11 having left and right overcenter variable displacement hydraulic pumps 12,13 driven by an engine 14. The variable displacements pumps 12,13 are connected to left and right hydraulic drive motors 16,17 through conventional closed loop circuits. The drive motors 16,17 are suitably drivingly connected to a pair of machine propelling elements 18,19 such as left and right tracks, as shown in this embodiment. The variable displacement pumps 12,13 each have a flow control element 21,22 disposed to control the direction and the rate of fluid output from the pump to the associated drive motor 16,17. Left and right double acting actuators 23,24 are suitably mechanically connected to the flow control elements 21,22. Each of the actuators 23,24 have a pair of springs 26,27 disposed in a pair of actuating chambers 28,29 to resiliently bias the flow control elements 21 to their centered zero flow position when no pressurized fluid is being input to the chambers or when the fluid pressure in the actuating chambers is equal.

The control system 10 is a bleed down type of control system and includes a source of pressurized fluid 31 such as a fixed displacement pilot pump driven by the engine 14 and connected to a tank 32 and to a supply conduit 33 which has a first level control orifice 34 disposed therein. A pilot conduit 36 communicates the supply conduit 33 with the chambers 29 of the actuators 23,24 and has a second level control orifice 37 disposed therein. Similarly, another pilot conduit 38 communicates the supply conduit with the chambers 28 of the actuators 23,24 and has another second level control orifice 39 disposed therein.

A forward travel control valve 41 is disposed between the tank 32 and the pilot conduit 36 downstream of the orifice 37. A reverse travel control valve 42 is disposed between the tank 32 and the pilot conduit 38 downstream of the orifice 39. A pair of left turn control orifices 43,44 are disposed in the pilot conduits 36 and 38 between the orifices 37 and 39 and the actuating chambers 29,28 of the left actuators 23. A pair of right turn control orifices 46,47 are disposed in the pilot conduits 36 and 38 between the orifices 37 and 39 and the actuating chambers 29,28 of the right actuator 24. A pair of check valves 48,49 are connected to the conduit 36 in parallel with the orifices 43,46 respectively. Another pair of check valves 51,52 are connected to the pilot conduit 38 and disposed in parallel with the orifices 44,47 respectively.

A left two position, three way pilot actuated diverter valve 53 is disposed between the actuating chambers 28,29 of the left actuator 23 and a left turn control valve 54 connected to the tank. A right two position, three way pilot actuated diverter valve 56 is disposed between the chambers 28,29 of the right actuator 24 and a right turn control valve 57 connected to the tank. The forward and reverse control valves 41,42 and the left turn and right turn control valves 54,57 are area control valves resiliently biased to the flow blocking position shown and are movable downward to establish a variable orifice 58 therethrough. The diverter valves 53,56 have an end 61 in communication with the pilot conduit 36 downstream of the orifice 37 and upstream of the orifices 43 and 46, and another end 62 connected to the pilot conduit 38 downstream of the orifice 39 and upstream of the orifices 44 and 47. A lever means 63 is provided for actuating each of the forward and reverse control valves independently of the other and for actuating each of the left turn and reverse turn control valves independently of the other and in combination with actuation of the forward and right control valves. The lever means 63 shown in this embodiment is an element of a joystick type control and for illustrative conveniences is shown in the form of a cross shaped member 64 having four arms 66–69 operatively associated with the forward control valve 41, right turn control valve 57, reverse control valve 42 and left turn control valve 54 respectively.

A means 70 is provided for decreasing the fluid pressure level in the first and second conduits when the speed of the engine drops below a high idle speed and the fluid output from the pilot pump decreases. The means includes, for example, a pressure regulating valve 71 disposed in the supply conduit 33 upstream of the orifice 34 for normally maintaining a control pressure in the supply conduit at a substantially constant predetermined level when the engine is operating at a selected speed and the output of the pilot pump is substantially constant. The control pressure is proportional to output flow from the pilot pump and is adjustable to a predetermined characteristic curve. In this embodiment, the pressure regulating valve 71 is a signal multiplying valve disposed to decrease the pressure level of the fluid in the supply conduit 33 commensurate with an decrease in the output flow from the pilot pump. The signal multiplying valve 71 includes an orifice 72 and is responsive to a differential pressure across the orifice 72 so that the control pressure in the supply conduit 33 is essentially proportional to the engine speed. Excess fluid from the pilot pump 31 is directed to a charge pressure relief valve 73.

Industrial Applicability

The forward and reverse control valves 41,42 and the left turn and right turn control valves 54,57 are shown in their flow blocking position such that no fluid flow exists in the control system 10. With the engine operating at the selected speed, the fluid pressure in the pilot conduits 36 and 38, and the actuating chambers 29,28 of the actuators 23 and 24 equalize at substantially the normal system operating pressure established by the pressure regulating valve 71 allowing the springs 26,27 of the actuators to bias the flow control elements 21,22 of the variable displacement pumps 12,13 to the centered zero flow position. The diverter valves 53 and 56 may or may not be in the position shown, depending upon which operating position they were at when the fluid pressure in the control system equalized. This is considered the neutral condition of the hydrostatic transmission 11.

If straight ahead forward travel of the machine is desired, the cross shaped member 64 is pivoted in the appropriate direction to depress the forward control valve 41 to establish the variable orifice 58 through the forward control valve 41. This creates a flow path through the orifices 34 and 37 and the pilot conduit 36 downstream of the orifice 37 to the tank 32. The fluid flow through the orifice 37 causes the pressure to decrease in the pilot conduit 36 downstream of the orifice. However, the fluid in the pilot conduit 38 remains substantially static resulting in the fluid pressure in the pilot conduit 38 and the actuating chambers 28 remaining at the system operating pressure so that the fluid pressure in the pilot conduit 36 is now less than the fluid pressure in the pilot conduit 38. The pressure decrease in the pilot conduit 36 causes the pressure in the actuating chambers 29 of both actuators 23,24 to decrease equally so that the actuators move the flow control elements 21,22 to establish fluid flow from the variable displacement pumps 12 and 13 to drive the drive motors 16 and 17, and thus the drive elements 18,19 in a forward direction. The rate of fluid flow output from the variable displacement pumps is proportional to the size of the variable orifice 58 through the forward control valve 41. The pressure decrease in the pilot conduit 36 also causes the diverter valves 53 and 56 to be moved to or be retained in their forward turn positions shown communicating the actuating chambers 28 with the left and right turn control valves.

If turning of the machine to the right is desired during forward travel described above, the cross shaped member 64 is pivoted to cause the arm 67 to depress the right turn pilot valve 57 to establish the variable orifice 58 therethrough while retaining the variable orifice 58 in the forward control valve 41. This creates a flow path through a portion of the pilot conduit 38 through the orifices 39 and 47, through the diverter valve 56, and the variable orifice 58 and the right turn valve 57. The fluid flow through the orifice 47 causes the pressure in the portion of the conduit 38 downstream of the orifice 47 and hence the fluid pressure in the actuating chamber 28 of the actuator 24 to decrease. This results in the right actuator 24 moving the flow control element 22 of the right pump 13 toward the centered position to reduce the fluid output from the right pump 13 to the motor 17 proportionate to the size of the variable orifice 58 through the right turn control valve 57. Reducing the fluid output to the motor 17 causes a reduction in the speed of the drive element 19 so that the machine turns to the right. If desired, the right turn pilot valve 57 can be depressed sufficiently to cause the pressure in the actuating chamber 28 be lower than the pressure in the actuator 29 of the actuator 24. This causes the right pump to drive the right drive motor 17 and the drive element 19 in reverse while the drive element 18 is driven in the forward direction. This provides the machine with a counter rotation or spot turn mode.

Reverse operation of the machine is achieved by appropriately moving the cross shaped member 64 to establish the variable orifice 58 through the reverse control valve 42. The fluid pressure in the pilot conduit 38 downstream of the orifice 39 decreases while the fluid pressure in the pilot conduit 36 remains the same. The decrease in pressure in the actuating chambers 28 results in the actuators 23,24 moving the flow control elements 21,22 in the opposite direction to drive the motors 16,17 and thus the elements 18,19 in the opposite direction. The pressure decrease in the pilot conduit 38 causes the diverter valves 53,56 to be moved to or retained in a downward reverse turn position communicating the actuating chambers with the left and right turn control valves.

Turning the machine to the right during reverse travel is initiated by pivoting the cross shaped member 64 to cause the arm 67 to depress the right turn pilot valve 57 to establish the variable orifice 58 therethrough while retaining the variable orifice 58 in the reverse control valve 42. With the diverter valve 56 in a downward actuated position, a flow path is established through a portion of the pilot conduit 36 through the orifices 37 and 46, through the diverter valve 56, and the variable orifice 58 and the right turn valve 57. The fluid flow through the orifice 46 causes the pressure in the portion of the conduit 36 downstream of the orifice 46 and hence the fluid pressure in the actuating chamber 29 of the actuator 24 to decrease. This results in the actuator 24 moving the flow control element 22 of the right pump 13 toward the centered position to reduce the fluid output from the variable displacement pump 13 to the motor 17 proportionate to the size of the variable orifice 58 through the right turn valve 57. Reducing the fluid output to the motor 17 causes a reduction in the speed of the drive element 19 so that the machine turns to the right. A counter rotation or spot turn can be achieved in reverse travel by further depression of the right turn valve 57 similar to that described above.

If the machine travel direction is reversed from the forward direction to a reverse direction while the control system is in a forward right turn maneuver described above, the machine will reverse over the same turn path. More specifically, changing the travel direction from forward to reverse is achieved by pivoting the cross shaped member 64 to initially release the forward turn valve 41 to block fluid flow therethrough and then depress the reverse control valve 42 to establish the variable orifice 58 therethrough. As described above, if the right turn valve is closed when the variable orifice 58 through the reverse control valve 42 is established, a pressure decrease is generated in both actuating chambers 29 causing the actuators to move the flow control elements 21,22 of the left and right pumps 12,13 equally to provide equal output flows from the variable displacement pumps to the drive motors 16,17 and the drive elements 18,19 would be driven at the same speed. Also, as described above, both diverter valves 53,56 move to the other operating position during a reverse travel condition. Thus, if the variable orifice 58 through the right turn control valve remains established by the member 64 when the member 64 is pivoted from the forward travel to the reverse travel position, a flow path is immediately created through the orifice 46, the diverter valve 56, and the right turn control valve 57 to the tank. This reduces the pressure in the chamber 28 of the actuator 24 causing the actuator 24 to move the flow control element 22 of the right pump 13 back toward the centered position. This reduces the rate of fluid output from the right pump 13 to the drive motor 17 causing a reduction in the speed of the drive element 19 relative to the speed of the left drive element 18 so that the machine travels over the same path.

A left turn during both forward and reverse travel is similarly achieved by establishing the variable orifice 58 in the left turn control valve 54 to reduce the speed of the drive element 18. A spot turn around the right drive element 19 can achieved in the neutral condition of the transmission by depressing the left turn valve 41. Similarly a spot turn around the left drive element 18 can achieved by depressing the right turn valve 42.

Under normal operating conditions, the engine 14 runs at a preselected high idle speed so that the pressure level in the control system remains at a substantially constant level commensurate with the engine speed. However, when the engine speed drop below the high idle speed under heavy lug conditions, fluid flow through the orifice 34 decreases causing the pressure in the supply conduit 33 downstream of the orifice 34 and in the pilot conduits 36,38. This decrease also occurs equally in the actuating chambers so that the speed of the drive motors 16,17 and the drive elements 18,19 decreases proportional to the decrease in pressure regardless of whether the machine is traveling straight or during a turning maneuver.

In view of the above, it is readily apparent that the structure of the present invention provides an improved control system for a hydrostatic transmission which provides automotive type steering wherein the machine travels over the same turn path when a direction change is made during a steering operation. This is accomplished by use of a bleed down type of control system in which normal system operating pressure is maintained in the control system at the neutral position of the hydrostatic transmission. Forward travel is achieved by simultaneously reducing the pressure in the first chambers of both the left and right pump control actuators by actuating a forward turn control valve while reverse travel is achieved by reducing the pressure in the second actuating chambers of both the left and right actuators by actuation of a reverse turn control valve. A right turn diverter valve is disposed between a right turn control valve and both chambers of the right actuator and is moved to forward and reverse turn positions during forward and reverse travel respectively. A left turn diverter valve is disposed between a left turn control valve and both chambers of the left actuator and is moved to forward and reverse turn positions during forward and reverse travel respectively. When the operator selects a right turn of the machine by actuating the right turn control valve, the right turn diverter valve decreases the pressure in the appropriate actuating chamber of the right actuator so that the machine turns to the right regardless of whether the machine is traveling in forward or reverse. Similarly, when the operator selects a left turn of the machine by actuating the left turn control valve, the left turn diverter valve decreases the pressure in the appropriate actuating chamber of the left actuator so that the machine turns to the left regardless of whether the machine is traveling in forward or reverse.

Other aspects, objects and advantages of this invention can be obtained from a study of the drawings, the disclosure and the appended claims.

What is claimed is:

1. A control system for a hydrostatic transmission having a pair of reversible variable displacement hydraulic pumps each of which has a flow control element disposed to control the direction and flow rate of fluid output from the associated variable displacement pump, and are of a first and second double acting actuator connected to the flow control element and having first and second actuating chambers and a spring disposed in each chamber to bias the flow control element to a centered zero output position, the control system comprising:

a source of pilot fluid including a supply conduit and a tank;

a first conduit communicating the supply conduit with the first chambers;

a first orifice disposed in the first conduit;

a second conduit communicating the supply conduit with the second chambers;

a second orifice disposed in the second conduit;

a forward control valve disposed between the tank and the first conduit downstream of the first orifice, the forward control valve having a closed position blocking the first conduit from the tank and being movable to establish a variable orifice communicating the first conduit with the tank;

a reverse control valve disposed between the tank and the second conduit downstream of the second orifice, the reverse control valve having a closed position blocking the second conduit from the tank and being movable to establish a variable orifice communicating the second conduit with the tank; and lever means for actuating each of the forward and reverse control valves individually of the other to establish the variable orifices.

2. The control system of claim 1 including a third orifice disposed in the first conduit between the first orifice and the first chamber of the second actuator, a fourth orifice disposed in the second conduit between the second orifice and the second chamber of the first actuator, and a first turn control valve disposed between the tank and the first actuator, a second turn control valve disposed between the tank and the second actuator, the lever means being disposed to actuate each of the first and second turn control valves individually of the other and in combination with actuation of either the forward or reverse control valves.

3. The control system of claim 2 including a fifth orifice disposed in the first conduit between the first orifice and the first chamber of the first actuator, a sixth orifice disposed in the second conduit between the second orifice and the second chamber of the second actuator, a pilot operated diverter valve connected to and disposed between the first turn control valve and the first and second conduits downstream of the fifth and fourth orifices, a second pilot actuated diverter valve connected to and disposed between the second turn control valve and the first and second conduits downstream of the third and sixth orifices, the first and second diverter valves having first ends in communication with the first conduit downstream of the first orifice and upstream of the third and fifth orifices and second ends in communication with the second conduit downstream of the second orifice and upstream of the fourth and sixth orifices.

4. The control system of claim 3 wherein the source of pilot fluid includes a fixed displacement pilot pump connected to the supply conduit, and including means for decreasing the fluid pressure level in the first and second conduits when the fluid output from the pilot pump decreases.

* * * * *

UNITED STATES PATENT AND TRADEMARK OFFICE
CERTIFICATE OF CORRECTION

PATENT NO.   : 5,875,631
DATED        : March 2, 1999
INVENTOR(S)  : David P. Smith It is certified that error appears in the above-identified patent and that said Letters Patent is hereby corrected as shown below:

Column 6, line 38, delete "are" and insert --one--

Signed and Sealed this

Twenty-ninth Day of June, 1999

Attest:

Q. TODD DICKINSON

Attesting Officer

Acting Commissioner of Patents and Trademarks